United States Patent
Kates et al.

[11] Patent Number: 6,075,352
[45] Date of Patent: Jun. 13, 2000

[54] REDIRECTED SEQUENTIAL FLYBACK SYNCHRONOUS RECTIFIER

[75] Inventors: Barry K. Kates, Austin; John Cummings, Round Rock, both of Tex.

[73] Assignee: Dell Computer Corporation, Round Rock, Tex.

[21] Appl. No.: 09/236,137

[22] Filed: Jan. 22, 1999

[51] Int. Cl.[7] .............................. G05F 1/40; G05F 1/618; H02M 3/335

[52] U.S. Cl. ........................... 323/283; 323/266; 363/21; 363/95

[58] Field of Search .................................... 323/283, 282, 323/266, 901; 363/21, 93, 95, 97, 98, 131

[56] References Cited

U.S. PATENT DOCUMENTS

| | | | |
|---|---|---|---|
| 4,853,837 | 8/1989 | Gulezynski | 363/80 |
| 5,221,887 | 6/1993 | Gulezynski | 323/285 |
| 5,339,446 | 8/1994 | Yamasaki et al. | 395/750 |
| 5,552,695 | 9/1996 | Schwartz | 323/271 |
| 5,612,862 | 3/1997 | Marusik et al. | 363/93 |
| 5,673,173 | 9/1997 | Tsai | 361/686 |
| 5,734,254 | 3/1998 | Stephens | 320/106 |
| 5,745,358 | 4/1998 | Faulk | 363/95 |
| 5,745,359 | 4/1998 | Faulk | 363/95 |
| 5,747,977 | 5/1998 | Hwang | 323/284 |

Primary Examiner—Edward H. Tso
Assistant Examiner—Rajnikani D. Patel
Attorney, Agent, or Firm—Skjerven, Morrill, MacPherson, Franklin & Friel, L.L.P.; Stephen A. Terrile; Mary Jo Bertani

[57] ABSTRACT

A switching flyback regulator circuit for providing a plurality of regulated DC voltage supplies, wherein one of the regulator circuits includes a saturable reactor for regulating one of the output voltages. The flyback regulator circuit includes a primary inductive element coupled to a first switch to turn charging current flow through the primary inductive element ON and OFF, a first secondary inductive element having a first end coupled to supply a first power source and magnetically coupled with the primary inductive element, and a second secondary inductive element magnetically coupled with the primary inductive element. The second secondary inductive element has a first end coupled to produce the second power source and a second end coupled in series with the saturable reactor and a second switch to control current flow through the second secondary inductive element. A control circuit is coupled to control the ON and OFF duty cycle of the second switch such that when the first switch is operated to allow the primary inductive element to discharge, current flows through the first secondary inductive element before current flows in the second secondary inductive element. A reset current signal controls current flow through the saturable reactor.

21 Claims, 5 Drawing Sheets

REDIRECTED SEQUENTIAL FLYBACK SYNCHRONOUS RECTIFIER

BACKGROUND OF THE INVENTION

1. Field of the Invention

This invention relates to the field of portable battery equipment, and more particularly, to synchronously switching, free-running flyback regulator power supplies in portable devices such as laptop computers.

2. Description of the Related Art

As digital integrated circuit manufacturers are working toward implementing an increasing number of audio, graphics, and data processing functions and circuits on a single silicon chip, lower bias voltages are necessary. The increased processing capability is accompanied by increasing power dissipation and heat. Further, improvements in energy and space efficiency are continually investigated with regard to power supplies for operating portable microprocessor-based devices. Temperature management is also a high priority, as elevated temperatures may adversely affect the device's reliability. To meet power requirements, the trend in the industry is to use a greater number of power supplies that provide lower voltages and increased current. Manufacturers of digital integrated circuits have standardized the new logic bias voltages to 3.3±0.3 volts for off-line operation and to 2.8±0.8 volts for battery operation.

Portable electronic devices are typically capable of operating with regulated DC power supply from a portable, rechargeable battery pack, or from an AC power supply using an AC to DC adapter. The adapter draws power from an AC source, such as an electrical socket, converts the AC signal to a DC signal, and supplies power to operate the device as well as to recharge the battery pack. AC adapter power conversion and battery recharging is accomplished most efficiently at high output voltage. To improve battery charging efficiency, it is therefore desirable to provide a high voltage signal to charge batteries.

Many portable electronic devices utilize Lithium ion (LI-ion) batteries which are capable of providing both high voltage and excellent capacity, resulting in relatively high energy density. The internal impedance of Li-ion batteries is very high, however, and the batteries are therefore more efficiently utilized in circuits that require high voltage and low current. This characteristic runs contrary to the industry trend to use lower voltages and increased current to operate portable electronic devices.

Converting DC voltage supplied by the battery or AC adapter to regulated DC voltage supplied to the device is accomplished most efficiently in situations where there is a low input to output voltage differential. This characteristic also runs contrary to the industry trend to utilize lower operating voltage, however, since low operating voltages increase the differential between the input and the output voltage. The differential voltage depends on the voltage delivered by the battery or the AC adapter and is typically greatest when utilizing power supplied by the AC adapter. To improve conversion efficiency, it is therefore desirable to generate a low voltage input signal that may be converted to regulated DC voltage supplied to the device.

Re-chargers for portable batteries utilize switching regulators to regulate DC power input to the battery pack. Switching regulators are typically classified into different configurations or "topologies." One such topology is the inverting or "flyback" regulator where a switch determines whether the voltage applied to an inductor is the input voltage, $V_{dc}$, or zero. In this manner, the output voltage is a function of the average voltage applied to the inductor. The regulator controls the turning ON and turning OFF of the switch in order to regulate the flow of power to the load. The switching regulator employs inductive energy storage elements to convert the switched current pulses into a steady load current. Power in a switching regulator is thus transmitted across the switch in discrete current pulses.

In order to generate a stream of current pulses, switching regulators typically include control circuitry to turn the switch on and off. The switch duty cycle, which controls the flow of power to the load, can be varied by a variety of methods. For example, the duty cycle can be varied by either (1) fixing the pulse stream frequency and varying the ON or OFF time of each pulse, or (2) fixing the ON or OFF time of each pulse and varying the pulse stream frequency. Which ever method is used to control the duty cycle, the switch in switching regulators is either OFF, where no power is dissipated by the switch, or ON in a low impedance state, where a small amount of power is dissipated by the switch. This generally results in fairly efficient operation with regard to the average amount of power dissipated compared to traditional circuits which employed a switch and a diode.

One method that has been utilized to improve operational efficiency of voltage regulators employs synchronous rectification. In synchronous rectification, a pair of switches, which are connected in series between the input voltage and ground, are synchronized so that either the input voltage or ground is applied to the input of an inductor.

In view of the foregoing, it is desirable to provide an AC adapter utilizing a synchronously switching flyback regulator that is capable of supplying a plurality of different voltages to efficiently meet low voltage and high voltage requirements in an electronic device.

SUMMARY

In one embodiment, a synchronously switching flyback regulator circuit for providing a plurality of regulated DC voltage power supplies is provided. The regulator circuit includes a primary inductive element coupled in series with a first switch to turn charging current flow through the primary inductive element ON and OFF, and a first secondary inductive element having a first end coupled to produce a first power source. The first secondary inductive element is magnetically coupled with the primary inductive element. A second secondary inductive element is also magnetically coupled with the primary inductive element. A saturable reactor and a second switch are coupled to control current flow through the second secondary inductive element. A reset current signal controls current flow through the saturable reactor and a control circuit is coupled to control the ON and OFF duty cycle of the second switch. The first switch is operated to allow the primary inductive element to discharge, thereby inducing magnetizing current in the secondary inductive elements. Current is forced to flow through the first secondary inductive element before the second secondary inductive element by keeping the second switch open until the energy requirements of the load connected to the first secondary inductive element are met. The second switch does not close until the flyback current is zero. Energy losses relative to the second switch are thus minimized since the second switch is operated when the magnitude of the current is either reduced from its beginning value or zero.

The present invention includes a ramped voltage generator circuit that outputs a ramp voltage signal for input to the control circuit. The magnitude of the ramp voltage signal decreases during each duty cycle of the first switch. The second switch is turned on when the value of the ramp voltage signal is less than or equal to a reference voltage. The second switch is turned off after the flyback interval is complete and before the start of the next flyback interval. The ramped voltage generator circuit includes a third switch coupled in parallel to the second secondary inductive element, a capacitor coupled in parallel to the third switch, and a current sink coupled in parallel to the capacitor. The capacitor is pulled up to a charged level between flyback intervals and discharges during the flyback intervals to create the ramp voltage signal.

The control circuit includes an error amplifier for generating an error signal indicative of the voltage output by the second power source, and a pulse width modulator coupled to receive the feedback signal and the ramp voltage signal. The pulse width modulator generates a driver signal that is input to a latch circuit. The latch circuit outputs the driver signal to the second switch.

Another embodiment of the present invention provides a method for generating a plurality of regulated DC voltage supplies utilizing a flyback regulator. The flyback regulator includes a primary inductive element magnetically coupled to a plurality of secondary inductive elements wherein one of the secondary inductive elements is coupled to a first switch and a saturable reactor. The method includes:

opening the first switch coupled with the one secondary inductive element;

charging the primary inductive element with a charge current over a controlled time period;

opening a second switch coupled to the primary inductive element, thereby reversing polarity of the inductive elements and causing magnetizing current to flow through another one of the secondary inductive elements;

generating a ramped voltage signal having a negative slope, and closing the first switch based on the ramped voltage signal and an error signal;

determining when to close the first switch subsequent to opening the second switch to allow current to flow through the one secondary inductive element; and supplying a controlled amount of reset current to the saturable reactor to regulate one of the voltage supplies.

Determining when to close the first switch includes generating an error signal indicative of the voltage output by the second power source; and generating a driver signal based on the feedback signal and the ramped voltage signal. The driver signal is set to close the first switch when the ramped voltage is less than or equal to the feedback signal and to open the first switch when the primary inductor begins charging. The reset current regulates the voltage output by the second power source. The second switch is coupled to the primary inductive element and is opened based on a signal from a control circuit between the primary inductive element and one of the secondary inductive elements.

The foregoing has outlined rather broadly the objects, features, and technical advantages of the present invention so that the detailed description of the invention that follows may be better understood.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
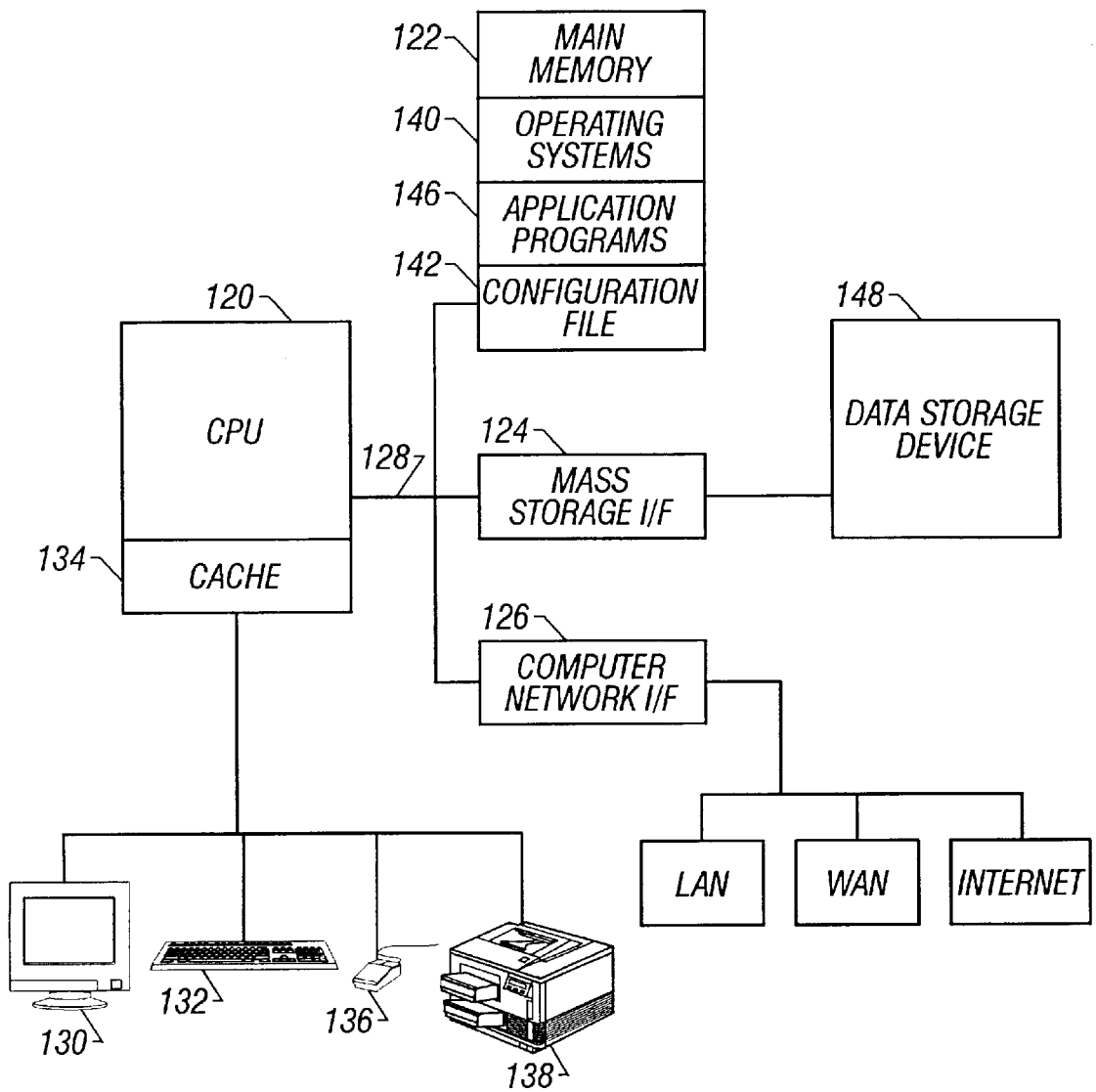
FIG. 1 is a block diagram of a components included in a laptop computer system.

Referring now to FIG. 1, a diagram of components commonly included in a computer system 100 within which the present invention may be utilized is shown. Those skilled in the art will appreciate, however, that the present invention may be utilized in other systems that require an input voltage to be adapted to supply power to two or more electrically-operated components within the system, with computers being one example.

Computer system 100 includes a central processing unit (CPU) 120, main memory 122, mass storage interface 124, and network interface 126, all connected by system bus 128. Note that system bus 128 may be a collection of several individual special purpose data busses known in the art such as a CPU bus, local bus, EISA bus, and/or SCSI bus. Computer system 100 encompasses all types of computer systems: personal computers, midrange computers, mainframes, etc. Note that many additions, modifications, and deletions can be made to this computer system 100 when used with the present invention. Examples of this are computer display 130, input keyboard 132, cache memory 134, and peripheral devices such as mouse 136 and printer 138. Computer system 100 may be one of many workstations connected to a local area network (LAN), a wide area network (WAN), or a global information network such as the Internet.

CPU 120 can be constructed from one or more microprocessors and/or integrated circuits. Main memory 122 stores programs and data that the CPU 120 may access. When computer system 100 starts up, CPU 120 initially executes the operating system 140 program instructions. Operating system 140 is a program that manages the resources of the computer system 100, such as the CPU 120, main memory 122, mass storage interface 124, network interface 126, and system bus 128. The operating system 140 reads one or more configuration files 142 to determine the hardware and software resources connected to the computer system 100.

Main memory 122 includes the operating system 140, configuration file 142, and one or more application programs 146 with related program data. Application programs 146 can run with program data as input, and output their results as program data in main memory 122 or to one or more mass storage devices 148 through mass storage interface 124. The CPU 120 executes many application programs such as an application program 146 to establish a connection to a computer network through network interface 126.

Mass storage interface 124 allows computer system 100 to retrieve and store data from auxiliary storage devices such as magnetic disks (hard disks, diskettes) and optical disks (CD-ROM). The mass storage devices are commonly known as Direct Access Storage Devices (DASD), and act as a permanent store of information. The information from the DASD can be in many forms including application programs and program data. Data retrieved through mass storage interface 124 is usually placed in main memory 122 where CPU 120 can process it.

While main memory 122 and data storage devices 148 are typically separate storage devices, computer system 100 may use known virtual addressing mechanisms that allow the programs of computer system 100 to behave as if they only have access to a large, single storage entity, instead of access to multiple, smaller storage entities (e.g., main memory 122 and mass storage devices 148). Therefore, while certain elements are shown to reside in main memory 122, those skilled in the art will recognize that these are not necessarily all completely contained in main memory 122 at the same time. It should be noted that the term "memory" is used herein to generically refer to the entire virtual memory of computer system 100.

Network interface 126 allows computer system 100 to send and receive data to and from any network computer system 100 may be connected to. This network may be a local area network (LAN), a wide area network (WAN), or a global information network such as the Internet. Suitable methods of connecting to the Internet 110 include known analog and/or digital techniques, as well as networking mechanisms that are developed in the future. Many different network protocols can be used to implement a network. The protocols are implemented in specialized software programs that allow computers to communicate across a network. TCP/IP (Transmission Control Protocol/Internet Protocol), used to communicate across the Internet 110, is an example of a suitable network protocol.

System bus 128 allows data to be transferred among the various components of computer system 100. Although computer system 100 is shown to contain only a single main CPU 120 and a single system bus 128, those skilled in the art will appreciate that the present invention may be practiced using a computer system that has multiple CPUs 120 and/or multiple busses 128. In addition, the interfaces that are used in the preferred embodiment may include separate, fully programmed microprocessors that are used to off-load computationally intensive processing from CPU 120, or may include input/output (I/O) adapters to perform similar functions.

Computer system 100 includes a power supply 150, for example, a battery, which provides power to the many components included in computer system 100. Power supply 150 is typically a rechargeable battery, such as a nickel metal hydride ("NiMH") or lithium ion ("Li-ion") battery, when computer system 100 is embodied as a portable or notebook computer. Power supply 150 is coupled to a power management microcontroller 152 which controls the distribution of power from power supply 150. More specifically, microcontroller 152 includes a power output 154 coupled to the main power plane 156 which supplies power to CPU 120. Power microcontroller 152 is also coupled to a power plane (not shown) which supplies power to computer display 130. Microcontroller 152 monitors the charge level of power supply 150 to determine when to charge and when not to charge battery. Microcontroller 152 is coupled to a main power switch 160 which the user actuates to turn the computer system 100 on and off. While microcontroller 152 powers down other portions of computer system 100 such as mass storage devices 148 when not in use to conserve power, microcontroller 152 itself is always coupled to a source of energy, namely power supply 150.

Computer system 100 also includes a power management chip set 164 coupled to CPU 120 via bus 128 so that power management chip set 164 can receive power control commands from CPU 120. Power management chip set 164 is connected to a plurality of individual power planes (not shown) which supply power to respective devices in computer system 100 such as mass storage devices 148, for example. In this manner, power management chip set 164 acts under the direction of CPU 120 to control the power to the various power planes and devices of the computer.

Different electrically-operated components in computer system 100 may each require a different level of DC voltage for operation. Computer system 100 typically includes regulator circuitry for converting AC voltage from an AC power source or DC voltage from an unregulated DC power source to precisely regulated levels of DC voltage. The different voltages are then provided to appropriate components in computer system 100. For example, a high voltage output is desired to charge batteries, whereas low voltage output is desired to operate DC to DC converters. There are several known topologies of regulator circuitry utilizing switching regulators for converting the voltage from one level to another. Many of the topologies require an output filter inductor that entails significant cost and physical space requirements. The present invention utilizes a topology known as a flyback regulator which does not require an output filter inductor and is therefore suited for applications where space is limited, such as laptop computer systems.

Figure 2:
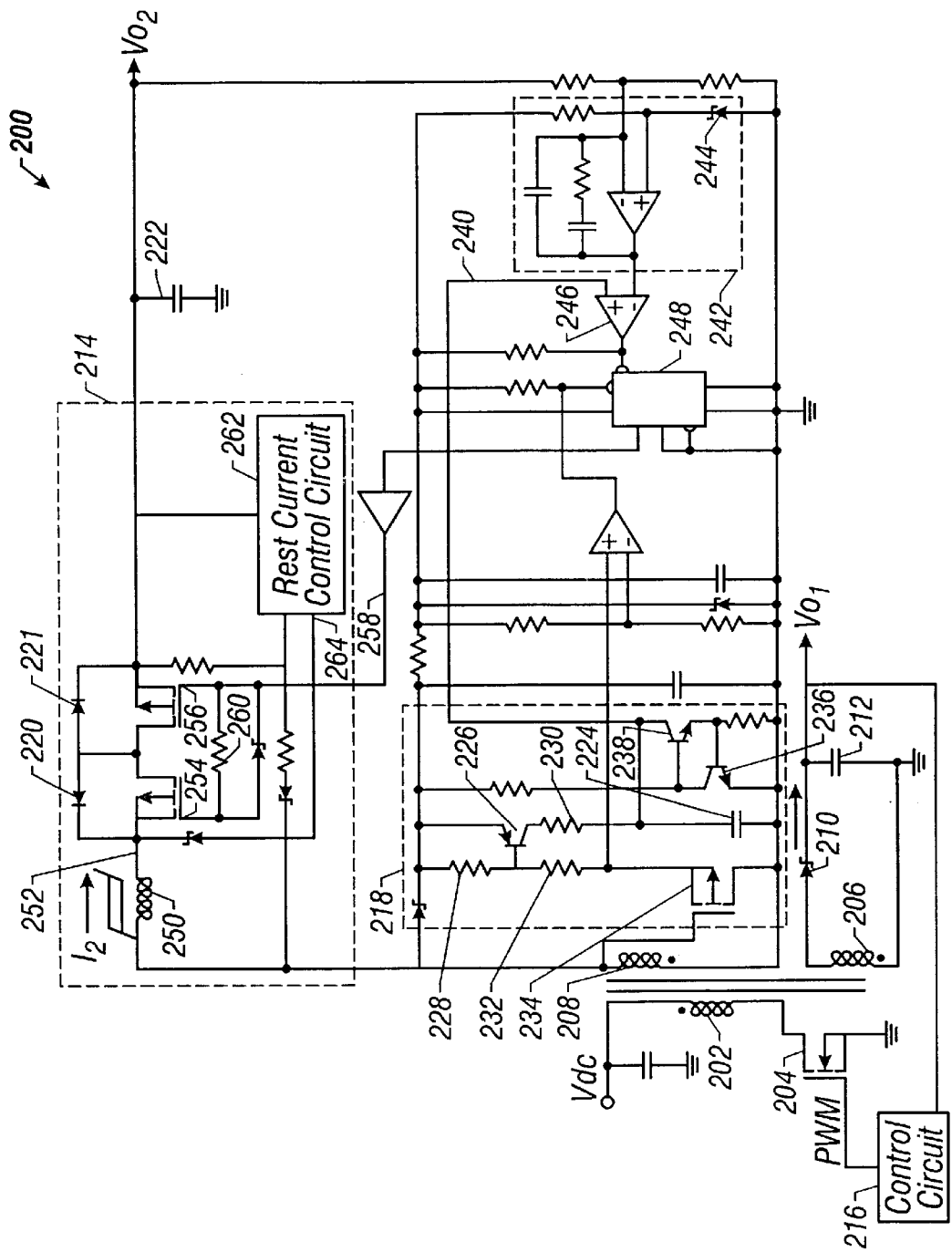
FIG. 2 is a schematic block diagram of a synchronously switching regulator circuit according to the present invention.

FIG. 2 shows a diagram of an embodiment of the present invention for a free-running flyback regulator circuit 200 that provides two regulated DC voltages, $V_{o1}$ and $V_{o2}$. Regulator circuit 200 operates from an unregulated DC supply voltage $V_{dc}$ coupled to a terminal, e.g., a battery (not shown). Note that the DC source may alternatively be derived from the output of an AC adapter, or by other conventional means. The alternating sequence of open and close actions by switching MOSFET 204 regulates the voltage such that the longer switching MOSFET 204 is closed, the higher the energy stored in primary inductive element 202. When the frequency of each ON or OFF pulse is variable, the flyback regulator is referred to as a freerunning flyback regulator. The current is applied sequentially to capacitors 212 and 222 as described hereinbelow. Capacitors 212, 222 smooth the pulsing supply of current to provide regulated voltage $V_{o1}$ and $V_{o2}$ respectively.

Regulator circuit 200 includes primary inductive element 202 coupled in series with a first switch, shown as MOSFET 204, to turn charging current flow through primary inductive element 202 ON and OFF. Secondary inductive elements 206, 208 are magnetically coupled with primary inductive element 202, such as those found in commercially available gapped ferrite core transformers. When current is transferred by primary inductive element 202, output voltage $V_{o1}$ is generated by the combination of secondary inductive element 206, diode 210, and capacitor 212 coupled together as shown in FIG. 2. This combination forms one source of power that may be provided to operate one or more components in computer system 100. Secondary inductive element 208 forms part of a second power source that produces second output voltage $V_{o2}$. A bilateral switch 214, is connected in series with inductive element 208 to turn current flow through inductive element 208 ON and OFF.

Figure 3A:
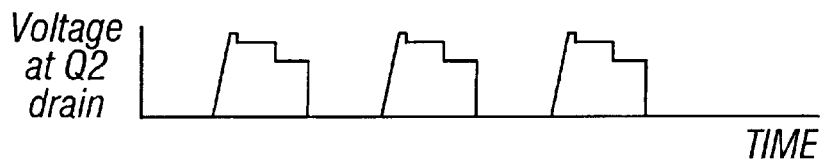
FIGS. 3A–3G are time history diagrams of voltage and current signals at various locations of the switching regulator circuit.
Figure 3B:
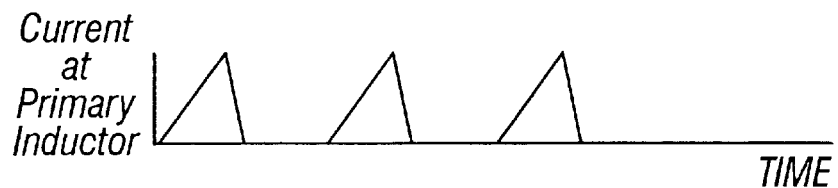
Figure 3C:
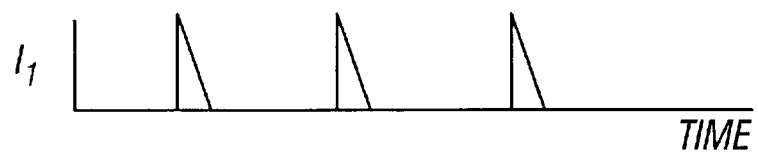
Figure 3D:
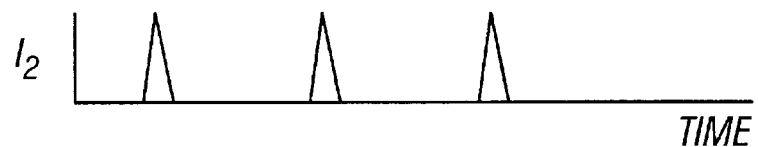
Figure 3E:
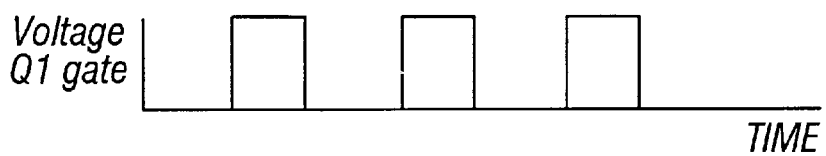
Figure 3F:
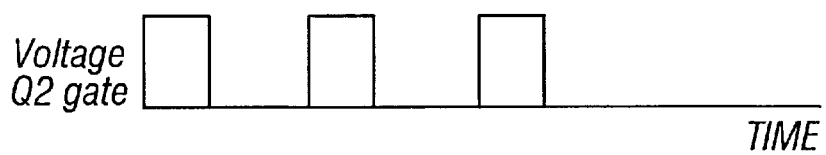

Control circuits 216, 218 control the switching of MOSFET 204 and bilateral switch 214 such that when MOSFET 204 is operated to allow primary inductive element 202 to discharge, current flows through secondary inductive element 206 before flowing in secondary inductive element 208. When MOSFET 204 is ON, the ends of primary inductive element 202 and secondary inductive elements 206, 208 shown with a dot are positive with respect to the ends without dots. Output rectifier diodes 210, 220, 221 are reverse-biased and all the output load currents are supplied from storage filter capacitors 212 and 222. During the time MOSFET 204 is ON, a fixed voltage exists across primary inductive element 202 and current in it ramps up linearly. Time history diagrams of flyback voltage and currents in the primary inductive element 202 and secondary inductive elements 206, 208 are shown in FIGS. 3a through 3d, respectively. FIGS. 3e through 3f show switching times of MOSFET 204 and bilateral switch 214, respectively.

When MOSFET 204 turns OFF, magnetizing inductance force causes reversal of polarity on inductive elements 202, 206, 208. Since the current in an inductor cannot change instantaneously, at the instant of turnoff, the current in primary inductive element 202 transfers sequentially to the secondary inductive elements 206, 208. This current transfer is known as the flyback interval. Assuming secondary inductive element 208 has a greater inductive capacity than secondary inductive element 206 (i.e., inductive capacity is proportional to the number of turns), the current naturally tries to flow to secondary inductive element 208. In the present invention, however, control circuit 216 turns bilateral switch 214 OFF at the start of the flyback interval and turns bilateral switch 214 ON after the required output voltage $V_{o1}$ has been supplied. The remaining flyback current is then diverted to secondary inductive element 208 to supply output voltage $V_{o2}$. In this manner, switching energy losses are eliminated when bilateral switch 214 turns OFF since current is zero. Energy losses are minimal when bilateral switch 214 turns ON, since the magnitude of the flyback current is substantially lower than it would be when switching occurs during an earlier portion of the flyback interval.

With MOSFET 204 OFF, the dot ends of the secondary inductive elements 206, 208 are negative with respect to the no-dot ends and current flows out of primary inductive element 202, but ramps down linearly at a rate proportional to its inductive capacity. When the secondary current has ramped down to zero before the start of the next MOSFET 204 ON time, all the energy stored in the primary inductive element 202 when MOSFET 204 was ON has been delivered to the loads and the circuit is operating in a discontinuous mode. Control circuit 216 maintains constant output voltage by keeping the product $V_{dc}T_{on}$ constant.

Figure 3G:
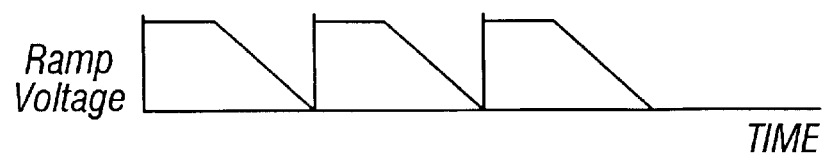

The embodiment of the present invention in FIG. 2 shows secondary inductive element 208, coupled at one end to ramped voltage generator circuit 218 and at the other end to control circuit 216, to turn bilateral switch 214 ON and OFF at the appropriate times. Ramped voltage generator circuit 218 includes capacitor 224 that is pulled up to a charged value by operation of transistor 226, resistors 228, 230, 232, and MOSFET 234 at the end of each flyback interval when bilateral switch 214 turns OFF. Specifically, during the flyback interval, p-channel MOSFET 234 and transistor 226 turn OFF. When the flyback interval is completed, the polarity of secondary inductive element 208 reverses, MOSFET 234 and transistor 226 are turned ON, and capacitor 224 recharges. During the flyback interval, transistors 236 and 238 form a constant current sink that discharges the voltage in capacitor 224 over time at constant current as shown in FIG. 3g, forming a ramp voltage signal 240 with a negative slope on the ramp portion of the signal. Capacitor 224 recharges and discharges over each duty cycle (i.e., each ON/OFF cycle) of MOSFET 204.

Error amplifier 242 generates an error signal $V_e$ based on the difference between output voltage $V_{o2}$ and a reference voltage, which may be provided by one of several known techniques such as utilizing zener diode 244. Pulse width modulator 246 receives error signal $V_e$ and ramp voltage signal 240, and generates a driver signal that is input to latch circuit 248. When the ramp crosses the value of error signal $V_e$, latch circuit 248 outputs a positive pulse and turns bilateral switch 214 ON. The negative slope of ramp voltage signal 240 thus delays switching bilateral switch 214 ON until energy required for output voltage $V_{o1}$ is met. At the time bilateral switch 214 is switched ON, the flyback current has a lower value, and thus switching losses are not as high. The residual flyback current is used to provide second output voltage $V_{o2}$, and bilateral switch 214 does not switch OFF until flyback current is zero, resulting in no energy loss at switch OFF.

The duty cycle of flyback regulator 200 is controlled by control circuit 216 which is coupled between primary inductive element 202 and secondary inductive element 206. Control circuit 216 receives output voltage signal $V_{o1}$ as a feedback signal and generates a pulse width modulated (PWM) signal that alternately turns MOSFET 204 ON and OFF as required to provide an alternating supply of current through primary inductive element 202 that meets the energy requirements of the loads connected to receive output voltages $V_{o1}$ and $V_{o2}$.

Figure 4:
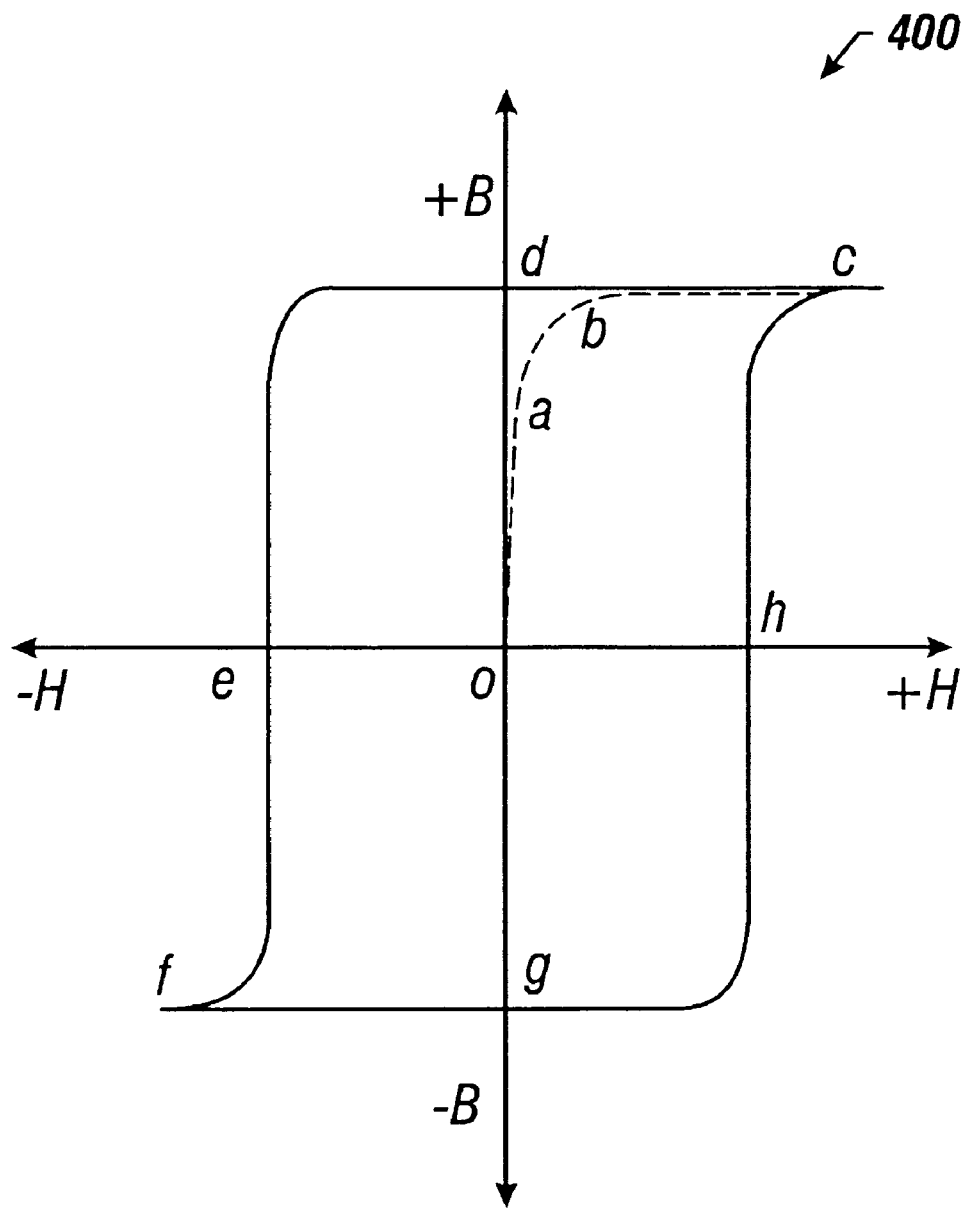
FIG. 4 is a graph showing magnetization characteristics of a saturable reactor utilized in the present invention.

Bilateral switch 214 is described in "High-Frequency Switching Power Supplies", by George C. Chryssis (McGraw-Hill, Inc., 1989), which is hereby incorporated by reference. The present invention utilizes the B-H characteristic of saturable reactor 250 to control the pulse width modulation of the input voltage. FIG. 4 shows a typical magnetization curve 402 of B (flux density) versus H (magnetic field strength) for saturable reactor 250. When saturable reactor 250 has not previously been subject to magnetization, the magnetization curve 402 starts at origin point o. As magnetic field strength H increases (i.e., increasing current), flux density B increases until saturation (as shown by dashed line o-a-b-c). When saturated, flux density B remains nearly constant even as magnetic field strength H is increased almost to its maximum level. During reversal of magnetic field strength H (i.e., decreasing current), flux density B does not return to origin point o even when the field strength H is reduced to zero. Instead, flux density B follows line c-d. Thus, after being subject to initial magnetization, saturable reactor 250 retains some magnetic flux B even though magnetic field strength H is reduced to zero. To reduce flux density B to zero, a negative or reverse magnetic field strength H must be applied (i.e., the current in the saturable reactor 250 must be reversed). As the reversed value of H is increased, flux density B moves down the d-e portion of curve 402 to a zero level of B.

When the reversed value of H is increased beyond the level needed to reduce flux density B to zero, the flux density B increases in a negative direction. A new portion of magnetization curve 402 along e-f is generated. At point f the reversed flux density reaches its saturation point (corresponding to point c on the positive half of curve 402). Once again, when the reversed field strength H is reduced to zero, the reversed flux density B does not become zero. To reduce flux density B to zero once more, field strength H must be increased in a positive direction, as shown by portion g-h of curve 402. When the magnetic field strength is further increased in a positive direction, the B/H relationship traces out the h-c section of curve 402.

Thus, when unsaturated, saturable reactor 250 acts as an inductance capable of supporting a large voltage with very little or no current flow. When saturable reactor 250 is saturated, the impedance drops to zero, allowing current to flow with zero voltage drop, advantageously providing a switch that operates with no energy loss. Bilateral switch 214 is comprised of switching transistors, shown in FIG. 2 as MOSFET 254 and MOSFET 256. Driver signal 258 is provided by pulse width modulator 246 through latch circuit 248 as described hereinabove. When driver signal 258 goes HIGH, MOSFET 256 is switched on. MOSFET 254 is also switched ON, but resistor 260 adds a delay to prevent capacitive loading of the gate drive signal for MOSFET 254. Additionally, it is important to switch MOSFET 256 ON quickly to optimize efficiency. When MOSFET 254 and 256 are initially ON, current is prevented from flowing by saturable reactor 250. Once saturable reactor 250 saturates, current is allowed to flow to provide $V_{o2}$. Utilizing saturable reactor 250 thus eliminates switching losses in MOSFETs 254 and 256, thereby improving efficiency of flyback regulator 200.

Due to the magnetization characteristics of saturable reactor 250 as shown in magnetization curve 402, once saturable reactor 250 is driven into saturation, a reverse current is required to take saturable reactor 250 out of saturation. The reverse current is referred to as reset current. In the embodiment of the present invention shown in FIG. 2, reset current control circuit 262 provides reset current signal 264 having a value based on the desired pulse width modulation required to regulate output voltage $V_{o2}$. Modulating the pulse width of the reset current effects the amount of time later required for forward current signal $I_2$ to saturate reactor 250. Thus, a small amount of reset current can be used to control the flow of a relatively large amount of forward current $I_2$.

Once the energy requirement of $V_{o1}$ is met, MOSFETs 254 and 256 are turned ON and energy is delivered to $V_{o2}$ until the secondary current $I_2$ goes to zero. In this particular embodiment of the invention, MOSFETs 254 and 256 remain logically enabled when the current is zero. MOSFETs 254 and 256 are turned OFF at the initiation of the primary charge interval, when the current is still zero, and therefore no energy is expended in switching them OFF.

Figure 5:
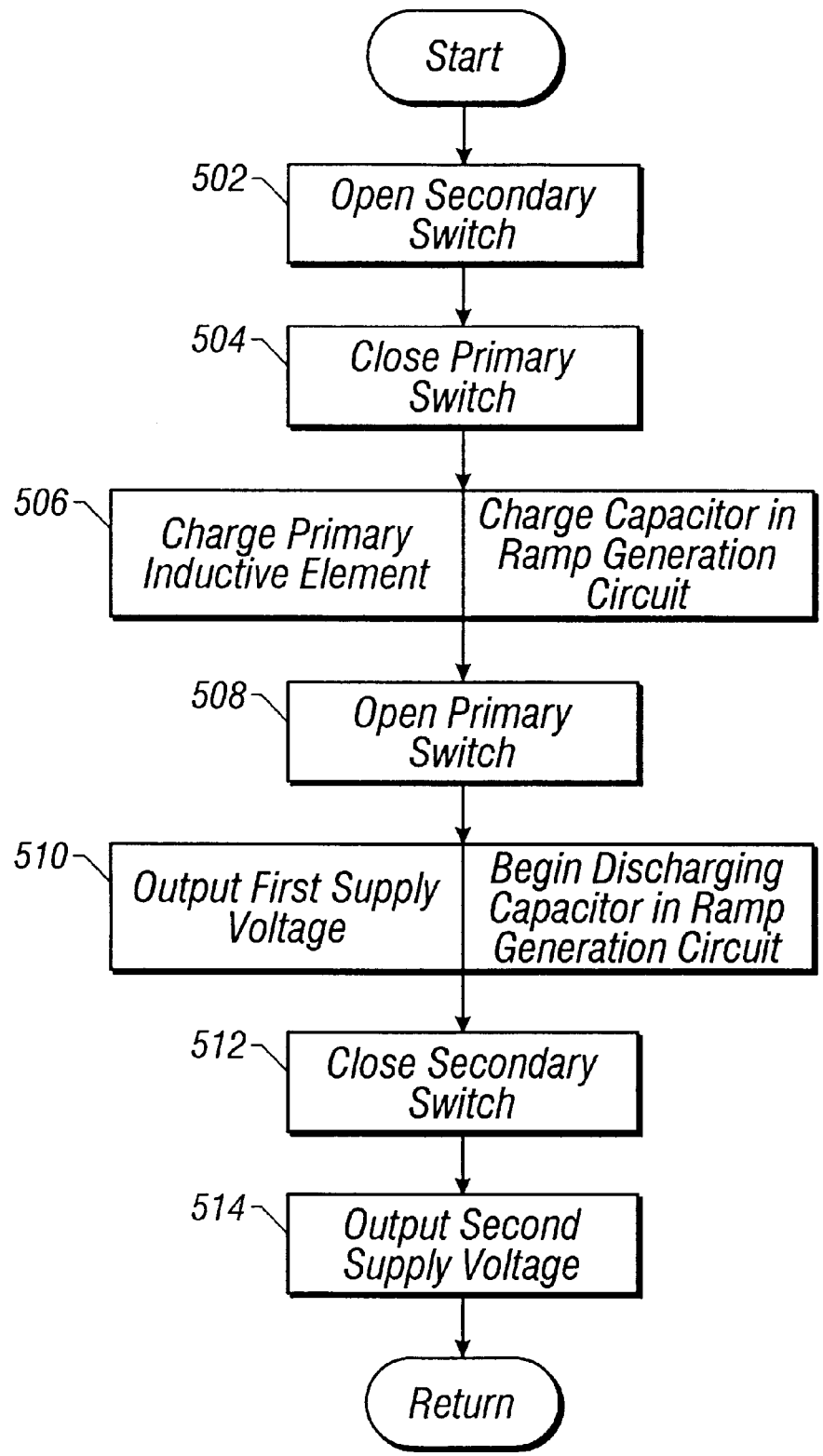
FIG. 5 is a flowchart of a method for supplying a plurality of DC voltages with a synchronously switching flyback regulator according to the present invention.

The sequence for generating a plurality of regulated DC voltage supplies utilizing a flyback regulator 200 such as shown in FIG. 2, that includes primary inductive element 202 magnetically coupled to at least two secondary inductive elements 206, 208, with one of the secondary inductive elements 208 being coupled to an electronic switch (bilateral switch 214), is presented in flowchart form in FIG. 5. The sequence begins by opening the switch (bilateral switch 214) coupled in series with the one secondary inductive element 208 as shown in block 502. Next, another electronic switch (MOSFET 204) coupled to the primary inductive element 202 is closed as shown in block 504. This causes the primary inductive element 202 and capacitor 224 to be charged over a controlled time period as shown in block 506 determined by control circuit 216. Block 508 shows that the switch coupled to the primary inductive element 202 is then opened. This causes reversal of polarity of the inductive elements, and since bilateral switch 214 is open, current flows through secondary inductive element 206 thereby providing output voltage $V_{o1}$ (block 510). At the same time current is flowing through secondary inductive element 206, capacitor 224 is discharging, generating a ramped voltage signal with a negative slope. When the value of the ramped voltage signal intersects an error voltage, bilateral switch 214 is latched closed as shown in block 512, thereby providing output voltage signal $V_{o2}$ (block 514). The cycle shown in FIG. 5 repeats at a frequency controlled by control circuit 216 that results in a relatively constant, or regulated, DC voltages being supplied to loads attached to the power supplies.

The embodiment of the present invention shown in FIG. 2 utilizes electronic hardware components, however, the present invention may be implemented using alternative combinations of components. For example, control circuit 216 could be any device capable of receiving signals from ramped voltage generator circuit 218 and any other type of reference voltage source instead of zener diode 244 and generating an error signal for input to another component that generates a control signal that is used to control the switching of bilateral switch 214. One such device could be a microcontroller utilizing hardware, software, and/or firmware to receive the signals and provide a control signal which is utilized to regulate the duty cycle of bilateral switch 214 so that current flows through secondary inductive element 206 before secondary inductive element 208 during the flyback interval. Advantageously, the power loss of saturable reactor 250 is very small, making it ideal for deriving low-voltage, high-current outputs, i.e., 3 volts or lower, at relatively high efficiency. Thus, it should be understood that the present invention provides a system for generating multiple output voltages from one input voltage that minimizes energy losses across switching elements by resequencing the order in which the power supply circuits receive flyback current so that the switching elements switch at lower, or zero, current values.

While the invention has been described with respect to the embodiments and variations set forth above, these embodiments and variations are illustrative and the invention is not to be considered limited in scope to these embodiments and variations. Accordingly, various other embodiments and modifications and improvements not described herein may be within the spirit and scope of the present invention, as defined by the following claims.

What is claimed:

1. A computer system comprising:

a memory having a set of program instructions stored therein;

a plurality of electrically-operated components including a first component coupled to receive power from a first power source and a second component coupled to receive power from a second power source;

a regulator circuit operable to provide the first power source and the second power source, the regulator circuit including:

a first inductive element coupled in series with a first switch to turn current flow through the first inductive element ON and OFF;

a second inductive element having a first end coupled to produce the first power source, and magnetically coupled with the first inductive element;

a third inductive element magnetically coupled with the first inductive element, the third inductive element having greater inductive capacity than the second inductive element, a first end coupled to produce the second power source, and a second switch to turn current flow through the third inductive element ON and OFF;

a saturable reactor coupled to control current flow from the third inductive element to the second switch; and a control circuit coupled to control the ON and OFF duty cycle of the second switch such that when the current is allowed to discharge through the first inductive element, current flows through the third inductive element subsequent to current flow in the second inductive element.

2. The computer system, as set forth in claim 1, further comprising a ramped voltage generator circuit that outputs a ramp voltage signal, the control circuit being coupled to receive the ramp voltage signal.

3. The computer system, as set forth in claim 2, wherein the magnitude of the ramp voltage signal decreases during each duty cycle of the first switch.

4. The computer system, as set forth in claim 3, wherein the control circuit includes:

an error amplifier for generating an error signal indicative of the voltage output by the second power source;

a pulse width modulator coupled to receive the feedback signal and the ramp voltage signal, the pulse width modulator generating a driver signal;

a latch circuit coupled to receive the driver signal and to output the driver signal to the second switch; and a reset current control circuit operable to generate a reset current signal and coupled to transmit the reset current signal to the saturable reactor.

5. The computer system, as set forth in claim 4, wherein the reset current control circuit generates the reset current signal to regulate the second power source.

6. The computer system, as set forth in claim 1, wherein the first, second, and third inductive elements comprise a flyback regulator, the flyback regulator further comprising a feedback circuit coupled between the first inductive element and the second inductive element.

7. The computer system, as set forth in claim 2, wherein the ramped voltage generator circuit includes a third switch coupled in parallel to the third inductive element, a capacitor coupled in parallel to the third switch, and a current sink coupled in parallel to the capacitor.

8. A regulator circuit for providing a plurality of regulated DC voltage power supplies, the regulator circuit comprising:

a first inductive element coupled in series with a first switch to turn charging current flow through the first inductive element ON and OFF;

a second inductive element having a first end coupled to produce the first power source, and magnetically coupled with the first inductive element;

a third inductive element magnetically coupled with the first inductive element, the third inductive element having greater inductive capacity than the second inductive element, a first end coupled to produce the second power source, and a second switch to turn current flow through the third inductive element ON and OFF;

a saturable reactor coupled to control current flow from the third inductive element to the second switch; and a control circuit coupled to control the ON and OFF duty cycle of the second switch such that when the first switch is operated to allow the first inductive element to discharge, current flows through the second inductive element before current flows in the third inductive element.

9. The regulator circuit, as set forth in claim 8, further comprising a ramped voltage generator circuit that outputs a ramp voltage signal, the control circuit being coupled to receive the ramp voltage signal.

10. The regulator circuit, as set forth in claim 9, wherein the magnitude of the ramp voltage signal decreases during each duty cycle of the first switch.

11. The regulator circuit, as set forth in claim 10, wherein the control circuit includes:

an error amplifier for generating an error signal indicative of the voltage output by the second power source;

a pulse width modulator coupled to receive the feedback signal and the ramp voltage signal, the pulse width modulator generating a driver signal;

a latch circuit coupled to receive the driver signal and to output the driver signal to the second switch; and a reset current control circuit operable to generate a reset current signal and coupled to transmit the reset current signal to the saturable reactor.

12. The regulator circuit, as set forth in claim 8, wherein the first, second, and third inductive elements comprise a flyback regulator, the flyback regulator further comprising a feedback circuit coupled between the first inductive element and the second inductive element.

13. The regulator circuit, as set forth in claim 9, wherein the ramped voltage generator circuit includes a third switch coupled in parallel to the third inductive element, a capacitor coupled in parallel to the third switch, and a current sink coupled in parallel to the capacitor.

14. A method for generating a plurality of regulated voltage supplies utilizing a flyback regulator, the flyback regulator including a primary inductive element magnetically coupled to a plurality of secondary inductive elements wherein a first secondary inductive element is coupled to a first switch and a saturable reactor, the first secondary inductive element having a greater inductive capacity than the other secondary inductive elements, the method comprising:

opening the first switch coupled with the first secondary inductive element;

charging the primary inductive element with a charge current over a controlled time period;

opening a second switch coupled to the primary inductive element, thereby reversing polarity of the inductive elements and causing magnetizing current to flow through a second secondary inductive element;

determining when to close the first switch subsequent to opening the second switch to allow current to flow through the first secondary inductive element; and supplying a controlled amount of reset current to the saturable reactor to regulate one of the voltage supplies.

15. The method, as set forth in claim 14, further comprising generating a ramped voltage signal having a negative slope, and closing the first switch based on the ramped voltage signal and an error signal.

16. The method, as set forth in claim 15, wherein determining when to close the first switch comprises:

generating an error signal indicative of the voltage output by the second power source; and generating a driver signal based on the feedback signal and the ramped voltage signal, the driver signal being set to close the first switch when the ramped voltage is less than or equal to the feedback signal and to open the first switch when the primary inductor begins charging.

17. The method, as set forth in claim 14, further comprising determining when to open the second switch coupled to the primary inductive element based on a signal from a control circuit between the primary inductive element and one of the secondary inductive elements.

18. The method, as set forth in claim 15 wherein generating the ramped voltage signal includes coupling a third switch in parallel to the one secondary inductive element, coupling a capacitor in parallel to the third switch, and coupling a current sink in parallel to the capacitor.

19. A method for changing the output sequence of a regulator circuit utilizing a flyback regulator to generate a plurality of DC voltage supplies, the flyback regulator including a primary inductive element magnetically coupled to at least two secondary inductive elements wherein a first secondary inductive element is coupled to a first switch and a saturable reactor, the method comprising:

opening the first switch coupled to the first secondary inductive element;

charging the primary inductive element with a charge current over a controlled time period;

discharging the current stored in the primary inductive element by opening a second switch coupled to the primary inductive element;

generating a ramped voltage signal having a negative slope;

generating an error signal indicative of a first voltage output by a DC voltage supply circuit including the first secondary inductive element;

generating a driver signal based on the error signal and the ramped voltage signal, the driver signal being set to close the first switch when the ramped voltage is less than or equal to the error signal and to open the first switch when the primary inductor begins charging; and supplying a controlled amount of reset current to the saturable reactor to regulate the first voltage output.

20. The method, as set forth in claim 19, wherein the current stored in the primary inductive element is discharged based on a signal from a control circuit coupled between the primary inductive element and one of the secondary inductive elements.

21. The method, as set forth in claim 19, wherein generating the ramped voltage signal includes coupling a third switch in parallel to the one secondary inductive element, coupling a capacitor in parallel to the third switch, and coupling a current sink in parallel to the capacitor.

* * * * *